United States Patent
Hu et al.

(10) Patent No.: US 11,799,043 B2
(45) Date of Patent: Oct. 24, 2023

(54) METHOD AND APPARATUS FOR STRING CONNECTING PHOTOVOLTAIC MODULES, DEVICE, AND STORAGE MEDIUM

(71) Applicants: ENVISION DIGITAL INTERNATIONAL PTE. LTD., Singapore (SG); SHANGHAI ENVISION DIGITAL CO., LTD., Shanghai (CN)

(72) Inventors: Yijie Hu, Shanghai (CN); Ning Xu, Shanghai (CN); Chen Zhang, Shanghai (CN); Xiu Jiang, Shanghai (CN); Guokun Huang, Shanghai (CN); Tianmin Zheng, Shanghai (CN)

(73) Assignees: ENVISION DIGITAL INTERNATIONAL PTE. LTD., Singapore (SG); SHANGHAI ENVISION DIGITAL CO., LTD., Shanghai (CN)

( * ) Notice: Subject to any disclaimer, the term of this patent is extended or adjusted under 35 U.S.C. 154(b) by 0 days.

(21) Appl. No.: 17/780,414

(22) PCT Filed: Nov. 25, 2020

(86) PCT No.: PCT/SG2020/050692
§ 371 (c)(1),
(2) Date: May 26, 2022

(87) PCT Pub. No.: WO2021/107873
PCT Pub. Date: Jun. 3, 2021

(65) Prior Publication Data
US 2023/0027541 A1    Jan. 26, 2023

(30) Foreign Application Priority Data
Nov. 26, 2019 (CN) .......................... 201911175761.X (51) Int. Cl.
*G06F 30/18* (2020.01)
*H01L 31/05* (2014.01)
(Continued)

(52) U.S. Cl.
CPC .............. *H01L 31/05* (2013.01); *G06F 30/18* (2020.01); *H02S 40/36* (2014.12); *G06F 30/12* (2020.01);
(Continued)

(58) Field of Classification Search
CPC ......... H01L 31/05; H02S 40/36; G06F 30/18; G06F 30/12; G06F 2111/00; G06F 2119/22
See application file for complete search history.

(56) References Cited

U.S. PATENT DOCUMENTS

| 6,546,535 B1 * | 4/2003 | Nagao ..................... G06F 30/18 |
| | | 716/120 |
| 10,776,531 B2 * | 9/2020 | Bieganek ................ H02S 40/32 |

(Continued)

FOREIGN PATENT DOCUMENTS

| CN | 104268368 A | 1/2015 |
| CN | 106446399 A | 2/2017 |

(Continued)

OTHER PUBLICATIONS

Notice of Reasons for Refusal dated Dec. 1, 2022 for Japanese Application No. 2022-530874.
(Continued)

*Primary Examiner* — Kibrom K Gebresilassie
(74) *Attorney, Agent, or Firm* — JCIP; Joseph G. Chu; Jeremy I. Maynard (57) ABSTRACT

Disclosed are a method and an apparatus for string connecting photovoltaic modules. The method includes: acquiring position information of n photovoltaic modules to be con-
(Continued)

nected; categorizing the n photovoltaic modules into m partitions based on the position information of the n photovoltaic modules; generating k candidate connection solutions of an $i^{th}$ partition in the m partitions, wherein the $i^{th}$ partition includes m photovoltaic modules, and each of the k candidate connection solutions uses one photovoltaic module in the m photovoltaic modules as a starting point, and obtaining at least one string of photovoltaic modules by simulating connection of the m photovoltaic modules according to a preset connection solution; and selecting a target connection solution from the k candidate connection solutions based on an estimated cable use amount corresponding to each of the k candidate connection solutions.

10 Claims, 8 Drawing Sheets

(51) Int. Cl.
*H02S 40/36* (2014.01)
*G06F 30/12* (2020.01)
*G06F 111/00* (2020.01)
*G06F 119/22* (2020.01)

(52) U.S. Cl.
CPC ....... *G06F 2111/00* (2020.01); *G06F 2119/22* (2020.01)

(56) References Cited

U.S. PATENT DOCUMENTS

| | | | | |
|---|---|---|---|---|
| 2012/0158362 | A1* | 6/2012 | Vandevelde | H02S 20/32 |
| | | | | 702/183 |
| 2013/0068277 | A1* | 3/2013 | Kataoka | H01L 31/02021 |
| | | | | 136/244 |
| 2014/0331198 | A1 | 11/2014 | Bischoff et al. | |
| 2014/0333340 | A1* | 11/2014 | Lynass | H02S 50/00 |
| | | | | 324/761.01 |
| 2015/0100281 | A1 | 4/2015 | Fink | |
| 2016/0294321 | A1* | 10/2016 | Bauer | G06Q 10/04 |

FOREIGN PATENT DOCUMENTS

| | | |
|---|---|---|
| CN | 106786763 A | 5/2017 |
| CN | 107133425 A | 9/2017 |
| CN | 108964114 A | 12/2018 |
| CN | 10266055 A | 9/2019 |
| CN | 110266055 A | 9/2019 |
| JP | 2000029926 A | 1/2000 |
| JP | 2004094660 A | 3/2004 |
| JP | 2014533072 A | 12/2014 |
| KR | 1020170017585 A | 2/2017 |
| WO | 2019187524 A1 | 4/2021 |

OTHER PUBLICATIONS

Notice of Preliminary Rejection dated Dec. 5, 2022 for Korean Application No. 10-2022-7021624.
Substantive Examination Adverse Report dated Nov. 14, 2022 by the Intellectual Property Corporation of Malaysia for Malaysian Application No. PI2022002696.
Examination Report dated Jun. 28, 2022 from the Intellectual Property Office of Singapore for Singapore Application No. 11202205255V.
Extended European Search Report dated Dec. 22, 2022 for European Application No. 20893970.2.
International Search Report and Written Opinion of International Searching Authority dated Mar. 15, 2021 for International Application No. PCT/SG2020/050692.
International Preliminary Report on Patentability dated Feb. 15, 2022.
Examination Report No. 1 dated Apr. 15, 2023 for Australian Application No. 2020391589.
Notice of Decision to Grant Patent dated Mar. 30, 2023 for Japanese Application No. 2022-530874.
Written Decision on Registration dated Feb. 22, 2023 for Korean Application No. 10-2022-7021624.

* cited by examiner

METHOD AND APPARATUS FOR STRING CONNECTING PHOTOVOLTAIC MODULES, DEVICE, AND STORAGE MEDIUM

TECHNICAL FIELD

Embodiments of the present disclosure relate to the field of photovoltaic power generation technology, and in particular to a method and an apparatus for string connecting photovoltaic modules, a device, and a storage medium.

BACKGROUND

The basic power generation unit of a photovoltaic power station is a photovoltaic module. In the process of constructing the photovoltaic power station, the photovoltaic modules need to be connected into strings.

In related art, after photovoltaic modules in each string are connected, positive and negative poles of the string of photovoltaic modules are left at both ends. In order to connect the string of photovoltaic modules into a combiner box, one of the positive and negative poles of the string of photovoltaic modules needs to be connected to the vicinity of the other pole by a cable, and then the string of photovoltaic modules is connected to the combiner box or an inverter through the same cable channel Therefore, the less a distance between the positive and negative poles of each string of photovoltaic modules is, the less a use amount of the cables is. After the photovoltaic modules are deployed in a photovoltaic region, relevant persons can manually design a method for string connecting the photovoltaic modules on a drawing, but the efficiency is low since repeated modifications are required on the drawing.

SUMMARY

Embodiments of the present disclosure provide a method and an apparatus for string connecting photovoltaic modules, a device, and a storage medium, which can solve the technical problem of low efficiency caused by manually designing a string connection manner of the photovoltaic modules. The technical solution is as follows.

In one aspect, embodiments of the present disclosure provide a method for string connecting photovoltaic modules, which is applied to a computer device. The method includes:

acquiring position information of n photovoltaic modules to be connected, wherein n is an integer greater than 1;

categorizing the n photovoltaic modules into m partitions based on the position information of the n photovoltaic modules, wherein each of the partitions includes a plurality of photovoltaic modules, and m is an integer greater than 1 and less than n;

generating k candidate connection solutions of an $i^{th}$ partition in the m partitions, wherein the $i^{th}$ partition includes $n_i$ photovoltaic modules, and each of the k candidate connection solutions uses one of the $n_i$ photovoltaic modules as a starting point, and obtains at least one string of photovoltaic modules by simulating connection of the $n_i$ photovoltaic modules according to a preset connection solution, i is a positive integer less than or equal to m, $n_i$ is an integer greater than 1 and less than n, and k is an integer greater than 1;

calculating estimated cable use amounts respectively corresponding to the k candidate connection solutions; and selecting a target connection solution corresponding to the $i^{th}$ partition from the k candidate connection solutions based on the estimated cable use amounts respectively corresponding to the k candidate connection solutions.

In some optional embodiments, generating the k candidate connection solutions of the $i^{th}$ partition in the m partitions includes:

generating a matrix of the $i^{th}$ partition, wherein the matrix is configured to characterize a position distribution of the $n_i$ photovoltaic modules in the $i^{th}$ partition; and generating the k candidate connection solutions based on the matrix.

In some optional embodiments, generating the k candidate connection solutions based on the matrix includes:

selecting one photovoltaic module from the $n_i$ photovoltaic modules as the starting point, and obtaining one candidate connection solution by connecting the $n_i$ photovoltaic modules according to a preset module string capacity and a preset module selection priority; and replacing the starting point, and obtaining another candidate connection solution by connecting the $n_i$ photovoltaic modules by the above step, until the k candidate connection solutions are generated;

wherein the module string capacity is a number of photovoltaic modules contained in the string of photovoltaic modules, the matrix includes at least one photovoltaic array, and the module selection priority is in a descending order of: the photovoltaic modules of a first photovoltaic array, the photovoltaic modules of a second photovoltaic array, and the photovoltaic modules of a third photovoltaic array in sequence;

wherein the first photovoltaic array is a photovoltaic array where the photovoltaic modules in a currently generated string of photovoltaic modules are located, the second photovoltaic array is an adjacent photovoltaic array of the first photovoltaic array in a first direction, and the third photovoltaic array is an adjacent photovoltaic array of the first photovoltaic array in a second direction; and a distance between the first photovoltaic array and the second photovoltaic array is less than a distance between the first photovoltaic array and the third photovoltaic array.

In some optional embodiments, selecting one photovoltaic module from the $n_i$ photovoltaic modules as the starting point, and obtaining one candidate connection solution by connecting the $n_i$ photovoltaic modules according to a preset module string capacity and a preset module selection priority:

selecting one photovoltaic module from the $n_i$ photovoltaic modules as the starting point, and obtaining the string of photovoltaic modules by preferentially connecting the photovoltaic modules in the same photovoltaic array according to the module string capacity;

connecting the photovoltaic module across the photovoltaic array when an unconnected photovoltaic module is present in the photovoltaic array; and obtaining one candidate connection solution after the $n_i$ photovoltaic modules are connected.

In some optional embodiments, connecting the photovoltaic module across the photovoltaic array includes:

determining a target photovoltaic module that belongs to a different photovoltaic array from the unconnected photovoltaic module and is most proximal to the unconnected photovoltaic module;

disconnecting the string of photovoltaic modules where the target photovoltaic module is located when the target photovoltaic module has been connected to the string; and obtaining a string of photovoltaic modules across the photovoltaic array by connecting the target photovoltaic module to the unconnected photovoltaic module.

In some optional embodiments, the method, before generating the k candidate connection solutions of the $i^{th}$ partition in the m partitions, the method further includes:

acquiring parameters and history environmental information of the $n_i$ photovoltaic modules;

determining a maximum value and a minimum value of the numbers of photovoltaic modules contained in the strings of photovoltaic modules based on the parameters and the history environmental information of the $n_i$ photovoltaic modules; and setting the module string capacity of the $i^{th}$ partition based on the maximum value and the minimum value, wherein the module string capacity is the number of photovoltaic modules contained in the string of photovoltaic modules, and the module string capacity is between the maximum value and the minimum value.

In some optional embodiments, selecting a target connection solution corresponding to the $i^{th}$ partition from the k candidate connection solutions based on the estimated cable use amounts respectively corresponding to the k candidate connection solutions includes:

determining a minimum value of the estimated cable use amounts respectively corresponding to the k candidate connection solutions; and determining the candidate connection solution corresponding to the minimum value of the estimated cable use amounts as the target connection solution corresponding to the $i^{th}$ partition.

In another aspect, embodiments of the present disclosure provide an apparatus for string connecting photovoltaic modules, which includes:

an information acquiring module, configured to acquire position information of n photovoltaic modules to be connected, wherein n is an integer greater than 1;

a module categorizing module, configured to categorize the n photovoltaic modules into m partitions based on the position information of the n photovoltaic modules, wherein each of the partitions includes a plurality of photovoltaic modules, and m is an integer greater than 1 and less than n;

a solution generating module, configured to generate k candidate connection solutions of the $i^{th}$ partition in the m partitions, wherein the $i^{th}$ partition includes $n_i$ photovoltaic modules, and each of the k candidate connection solutions uses one of the $n_i$ photovoltaic modules as a starting point, and obtains at least one string of photovoltaic modules by simulating the connection of the $n_i$ photovoltaic modules according to a preset connection solution, i is a positive integer less than or equal to m, $n_i$ is an integer greater than 1 and less than n, and k is an integer greater than 1;

a use amount calculating module, configured to calculate estimated cable use amounts respectively corresponding to the k candidate connection solutions; and a solution selecting module, configured to corresponding to the $i^{th}$ partition connection solution from the k candidate connection solutions based on the estimated cable use amounts respectively corresponding to the k candidate connection solutions.

In some optional embodiments, the solution generating module includes:

a matrix generating sub-module, configured to generate a matrix of the $i^{th}$ partition, wherein the matrix is configured to characterize a position distribution of the $n_i$ photovoltaic modules in the $i^{th}$ partition; and a solution generating sub-module, configured to generate the k candidate connection solutions based on the matrix.

In some optional embodiments, the solution generating sub-module is configured to select one photovoltaic module from the $n_i$ photovoltaic modules as the starting point, and obtain one candidate connection solution by connecting the $n_i$ photovoltaic modules according to a preset module string capacity and a preset module selection priority.

The solution generating sub-module is further configured to replace the starting point, and obtain another candidate connection solution by connecting the $n_i$ photovoltaic modules by the above step, until the k candidate connection solutions are generated.

The module string capacity is the number of photovoltaic modules contained in the string of photovoltaic modules, the matrix includes at least one photovoltaic array, and the module selection priority is in a descending order of: the photovoltaic modules of a first photovoltaic array, the photovoltaic modules of a second photovoltaic array, and the photovoltaic modules of a third photovoltaic array in sequence.

The first photovoltaic array is a photovoltaic array where the photovoltaic modules in a currently generated string of photovoltaic modules are located, the second photovoltaic array is an adjacent photovoltaic array of the first photovoltaic array in a first direction, and the third photovoltaic array is an adjacent photovoltaic array of the first photovoltaic array in a second direction; and a distance between the first photovoltaic array and the second photovoltaic array is less than a distance between the first photovoltaic array and the third photovoltaic array.

In some optional embodiments, the solution generating sub-module includes a module string connecting unit, configured to select one photovoltaic module from the $n_i$ photovoltaic modules as the starting point, and obtain the string of photovoltaic modules by preferentially connecting the photovoltaic modules in the same photovoltaic array according to the module string capacity;

an inter-array connecting unit, configured to connect the photovoltaic module across the photovoltaic array when an unconnected photovoltaic module is present in the photovoltaic array; and a solution generating unit, configured to obtain one candidate connection solution after the $n_i$ photovoltaic modules are connected.

In some optional embodiments, the inter-array connecting unit is configured to determine a target photovoltaic module that belongs to a different photovoltaic array from the unconnected photovoltaic module and is most proximal to the unconnected photovoltaic module; disconnect the string of photovoltaic modules where the target photovoltaic module is located when the target photovoltaic module has been connected to the string; and obtain a string of photovoltaic modules across the photovoltaic array by connecting the target photovoltaic module to the unconnected photovoltaic module.

In some optional embodiments, the apparatus further includes a capacity setting module configured to acquire parameters and history environmental information of the $n_i$ photovoltaic modules; determine a maximum value and a minimum value of the numbers of photovoltaic modules contained in the strings of photovoltaic modules based on the parameters and the history environmental information of the $n_i$ photovoltaic modules; and set the module string capacity based on the maximum value and the minimum value, wherein the module string capacity is the number of photovoltaic modules contained in the string of photovoltaic modules, and the module string capacity is between the maximum value and the minimum value.

In some optional embodiments, the solution selecting module is configured to determine a minimum value of the estimated cable use amounts respectively corresponding to the k candidate connection solutions; and determine the candidate connection solution corresponding to the minimum value of the estimated cable use amounts as the target connection solution.

In yet another aspect, embodiments of the present disclosure provide a computer device. The computer device includes a processor and a memory storing a computer program therein. The computer program, when loaded and run by the processor, causes the processor to perform the method for string connecting photovoltaic modules as described above.

In still a further aspect, embodiments of the present disclosure provide a computer-readable storage medium storing a computer program therein. The computer program, when loaded and run by a processor, causes the processor to perform the method for string connecting photovoltaic modules as described above.

The technical solutions according to the embodiments of the present disclosure at least achieve the following beneficial effects:

By acquiring the position information of the photovoltaic modules, the photovoltaic modules are partitioned. In each partition, with different photovoltaic modules as the starting point, according to the preset connection solution, k candidate connection solutions are generated, and then the target connection solution is selected based on the estimated cable use amount corresponding to each of the k candidate connection solutions. In the technical solution provided by the embodiments of the present disclosure, on one hand, the k candidate connection solutions are automatically generated according to the preset connection solution, and the target connection solution is selected therefrom, thereby improving the string connection efficiency of the photovoltaic modules. On the other hand, the photovoltaic modules are partitioned, and the target connection solution corresponding to each partition is determined. Compared with manual string connection where the problem of missing photovoltaic modules is likely to occur, the present disclosure can avoid the condition of missing the connection of the photovoltaic modules and ensure integrity.

It should be understood that the above general description and the following detailed description are only exemplary and explanatory, and cannot limit the present disclosure.

BRIEF DESCRIPTION OF THE DRAWINGS

For clearer descriptions of the technical solutions according to the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Exemplary embodiments are described in detail here, and examples thereof are shown in the accompanying drawings. When the following description refers to the accompanying drawings, unless otherwise indicated, the same numbers in different accompanying drawings indicate the same or similar elements. The implementation manners described in the following exemplary embodiments do not represent all implementation manners consistent with the present disclosure. Rather, they are merely examples of methods consistent with some aspects of the present disclosure as detailed in the appended claims.

Figure 1:
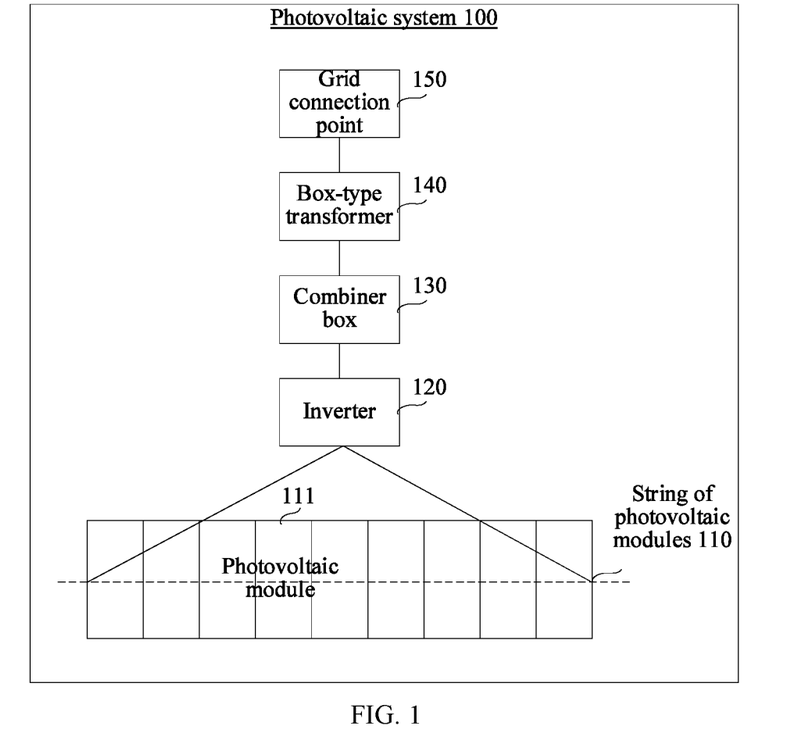
FIG. 1 shows a schematic structural diagram of a photovoltaic system according to an embodiment of the present disclosure.

Referring to FIG. 1, FIG. 1 shows a schematic structural diagram of a photovoltaic system according to an embodiment of the present disclosure. As shown in FIG. 1, the photovoltaic system 100 includes a string of photovoltaic modules 110, an inverter 120, a combiner box 130, a box-type transformer 140 and a grid connection point 150. The string of photovoltaic modules 110, the inverter 120, the combiner box 130, the box-type transformer 140 and the grid connection point 150 may be connected in sequence.

The photovoltaic system 100 includes a plurality of strings of photovoltaic modules 110, and the string of photovoltaic modules 110 is obtained by connecting a plurality of photovoltaic modules 111 in series.

Figure 2:
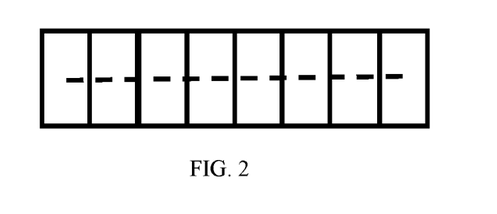
FIG. 2 exemplarily shows a schematic diagram of a string of photovoltaic modules connected in a straight line.
Figure 3:
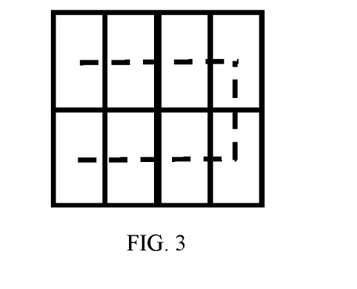
FIG. 3 exemplarily shows a schematic diagram of a string of photovoltaic modules connected in a U shape.
Figure 4:
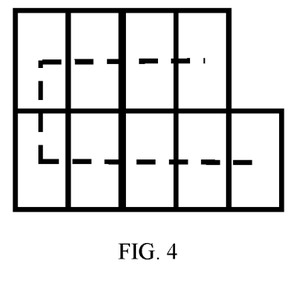
FIG. 4 exemplarily shows a schematic diagram of another string of photovoltaic modules connected in a U shape.
Figure 5:
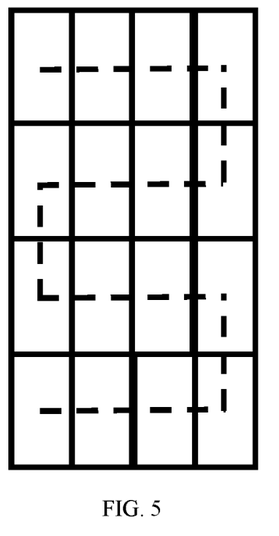
FIG. 5 exemplarily shows a schematic diagram of a string of photovoltaic modules connected in an S shape.

Referring to FIGS. 2, 3, 4, and 5, FIG. 2 exemplarily shows a schematic diagram of a string of photovoltaic modules connected in a straight line; FIG. 3 exemplarily shows a schematic diagram of a string of photovoltaic modules connected in a U shape; FIG. 4 exemplarily shows a schematic diagram of another string of photovoltaic modules connected in a U shape; and FIG. 5 exemplarily shows a schematic diagram of a string of photovoltaic modules connected in an S shape. The connection manners of the string of photovoltaic modules 110 may include the straight line connection as shown in FIG. 2, the U-shaped connection as shown in FIG. 3 and FIG. 4, and the S-shaped connection as shown in FIG. 5.

The photovoltaic module 111 is a basic power generation unit of the photovoltaic system 100, and consists of a high-efficiency crystalline silicon solar cell, ultra-white textured tempered glass, an ethylene-vinyl acetate (EVA) copolymer, a transparent polyvinyl fluoride composite film backplane and an aluminum alloy frame. The photovoltaic module 111 has the characteristics of long service life and good pressure resistance. An output power of photovoltaic module is proportional to the irradiance of sunlight. The stronger the sunlight is, the higher the output power of the module is. The structural type of the photovoltaic module 111 includes: a glass shell type, a bottom box type, a flat plate type, and a fully glue-sealed type without a cover plate.

The inverter 120 is configured to implement rectification and inversion functions. The rectification is a process of converting an alternating current into a direct current, and the inversion is a process of converting the direct current into the alternating current.

The combiner box 130 is configured to ensure the orderly connection of the photovoltaic modules. The combiner box 130 can ensure that a circuit is easy to cut off during maintenance and inspection of the photovoltaic system 100, and the scope of power outage is reduced when the photovoltaic system fails. A user may connect a certain number of photovoltaic modules 111 with the same specification in series to form one string of photovoltaic modules 110, and then connect several strings of photovoltaic modules 110 in parallel into the combiner box 130. After the currents of respective strings of photovoltaic modules 110 are concentrated in the combiner box 130, the respective strings of photovoltaic modules are connected into the box-type transformer 140.

The box-type transformer 140 is configured to change a voltage of the current in the combiner box. The current transformed by the box-type transformer 140 may be connected to a municipal power grid through the grid connection point 150. According to the box-type transformer 140, traditional transformers are concentrated in a box-type shell. The box-type transformer has the characteristics such as small size, light weight, low noise, low loss, and high reliability, and is widely used in residential quarters, commercial centers, light stations, airports, factories and mines, enterprises, hospitals, schools and other places.

In the method according to the embodiment of the present disclosure, the subject of executing each step may be a computer device. The computer device is an electronic device with data calculation, processing, and storage capabilities. The computer device may be a terminal such as a tablet computer, a personal computer (PC) and a smart robot and may also be a server.

Hereinafter, the technical solutions of the present disclosure are introduced and explained through several embodiments.

Figure 6:
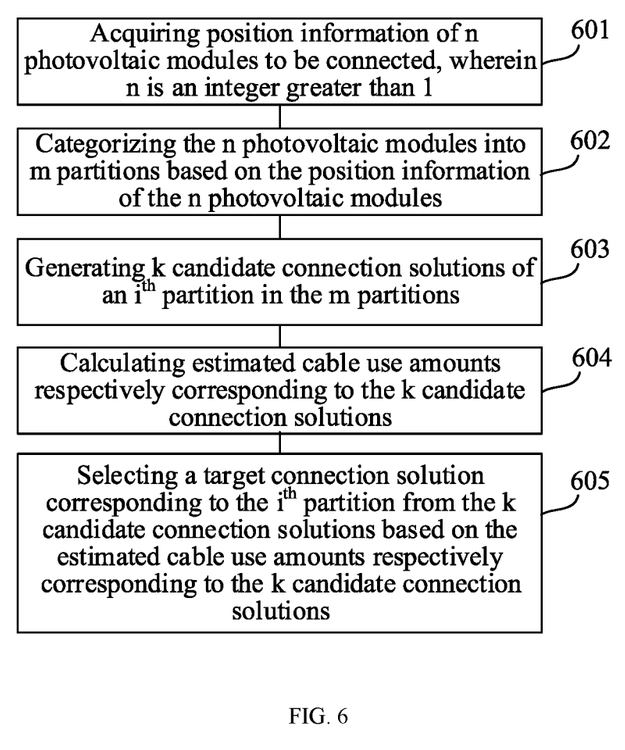
FIG. 6 shows a flowchart of a method for string connecting photovoltaic modules according to an embodiment of the present disclosure.

Referring to FIG. 6, FIG. 6 shows a flowchart of a method for string connecting photovoltaic modules according to an embodiment of the present disclosure. In the present embodiment, the method is mainly applied to the computer device introduced above for illustration. The method may include the following steps:

In step 601, position information of n photovoltaic modules to be connected is acquired, wherein n is an integer greater than 1.

After the photovoltaic modules are deployed, the position information of each photovoltaic module may be entered. The position information may include regions where the photovoltaic modules are located, such as roofs, flat ground, and carport roofs. When the photovoltaic modules are deployed in rows and columns, the position information may include the information of the row and column where each photovoltaic module is located.

In some optional embodiments, the laying condition of the photovoltaic modules may be represented as a picture at first. The picture may be a photo or a simplified engineering drawing. Afterwards, the computer device may use the technology such as image recognition to analyze the picture, thereby obtaining and storing the position information of the photovoltaic modules.

In step 602, the n photovoltaic modules are categorized into m partitions based on the position information of the n photovoltaic modules.

Each partition includes a plurality of photovoltaic modules, and m is an integer greater than 1 and less than n.

In some optional embodiments, the n photovoltaic modules are categorized into different partitions according to the regions where the photovoltaic modules are located, such as the roofs, the flat ground and the carport roofs, and the number and distribution condition of the photovoltaic modules in respective regions.

In some optional embodiments, the photovoltaic modules in the same partition may be in the same region; and/or, the shape of a figure formed by the photovoltaic modules in the same partition is a regular geometric figure.

In some optional embodiments, if the photovoltaic modules are deployed on both the roof and the flat ground, the photovoltaic modules on the roof and the photovoltaic modules on the flat ground are in different partitions.

In some optional embodiments, for the roof and the flat ground with the same area where the photovoltaic modules are deployed, if the number of photovoltaic modules on the roof is twice the number of photovoltaic modules on the flat ground, in other words, if the density of the photovoltaic modules on the roof is twice the density of the photovoltaic modules on the flat ground, then the number of partitions of the photovoltaic modules on the roof can be greater than the number of partitions of the photovoltaic modules on the flat ground.

In step 603, k candidate connection solutions of an $i^{th}$ partition in the m partitions are generated.

The $i^{th}$ partition includes $n_i$ photovoltaic modules. Each of the k candidate connection solutions uses one of the $n_i$ photovoltaic modules as a starting point, and obtains at least one string of photovoltaic modules by simulating connection of the $n_i$ photovoltaic modules according to a preset connection solution, wherein i is a positive integer less than or equal to m, $n_i$ is an integer greater than 1 and less than n, and k is an integer greater than 1.

Within each partition, a plurality of candidate connection solutions may be available for the photovoltaic modules. For the $i^{th}$ partition, the connection of $n_i$ photovoltaic modules in the $i^{th}$ partition may be simulated by calling a preset program in the computer device, thereby generating k candidate connection solutions. The preset connection solution is set in the preset program.

In some optional embodiments, the preset connection solution represents a preset rule for connecting the photovoltaic modules.

In step 604, estimated cable use amounts respectively corresponding to the k candidate connection solutions are calculated.

For each of the k candidate connection solutions, the estimated cable use amount may be calculated with the same calculation manner, such that the estimated cable use amount corresponding to each of the k candidate connection solutions is obtained.

In some optional embodiments, the string of photovoltaic modules is obtained by connecting in series the photovoltaic modules by cables.

In some optional embodiments, each photovoltaic module is provided with a positive pole and a negative pole. When two photovoltaic modules are connected, the positive pole of one photovoltaic module is connected to the negative pole of the other photovoltaic module through the cable.

In some optional embodiments, g photovoltaic modules are respectively numbered as 1, 2, 3, 4, . . . g, g is an integer greater than or equal to 2, and (g-1) cables are respectively numbered as 1, 2, 3, 4, . . . (g-1). If the g photovoltaic modules are connected in series to form a string of photovoltaic modules, the positive pole of the second photovoltaic module may be connected to the negative pole of the first photovoltaic module with the first cable; the positive pole of the third photovoltaic module is connected to the negative pole of the second photovoltaic module with the second cable; the positive pole of the fourth photovoltaic module is connected to the negative pole of the third photovoltaic module with the third cable; and so on, and finally the positive pole of the $g^{th}$ photovoltaic module is connected to the negative pole of the $(g-1)^{th}$ photovoltaic module with the $(g-1)^{th}$ cable, thereby obtaining a string of photovoltaic modules containing the g photovoltaic modules. Two ends of the string of photovoltaic modules are the positive pole of the first photovoltaic module and the negative pole of the $g^{th}$ photovoltaic module respectively. The positive pole of the first photovoltaic module and the negative pole of the $g^{th}$ photovoltaic module will be connected to the same inverter or the same combiner box through the cable.

In some optional embodiments, the estimated cable use amount may be expressed as a total length of the cables connected between respective photovoltaic modules. Based on the position information of the photovoltaic modules, the distance between adjacent photovoltaic modules connected together can be obtained. After the candidate connection solution is determined, the estimated cable use amount of the candidate connection solution can be calculated based on the distance between adjacent photovoltaic modules connected together.

In some optional embodiments, the sum of the distances between adjacent photovoltaic modules connected together is approximately determined as the estimated cable use amount of the candidate connection solution; or, the sum of the distances between the positive and negative poles connected between adjacent photovoltaic modules connected together is approximately determined as the estimated cable use amount of the candidate connection solution.

In step 605, the target connection solution corresponding to the $i^{th}$ partition is selected from the k candidate connection solutions based on the estimated cable use amounts respectively corresponding to the k candidate connection solutions.

The target connection solution is the actually executed connection solution of connecting the photovoltaic modules in the $i^{th}$ partition.

In some feasible embodiments, step 605 may include the following sub-steps:
1. A minimum value of the estimated cable use amounts respectively corresponding to the k candidate connection solutions is determined.
2. The candidate connection solution corresponding to the minimum value of the estimated cable use amounts is determined as the target connection solution.

The method of determining the minimum value of the estimated cable use amounts may include mechanically sorting the respective estimated cable use amounts in order of size, and then selecting the minimum value of the estimated cable use amounts; or performing pairwise comparison on the respective estimated cable use amounts to select a smaller value of the two compared estimated cable use amounts, and then continuing to compare the smaller value with the remaining estimated cable use amounts until all the estimated cable use amounts are compared, wherein the smaller value obtained from the final comparison is the minimum value in the estimated cable use amounts.

In summary, in the embodiments of the present disclosure, by obtaining the position information of the photovoltaic modules, the photovoltaic modules are partitioned. In each partition, with different photovoltaic modules as the starting point, according to the preset connection solution, k candidate connection solutions are generated, and then the target connection solution is selected based on the estimated cable use amount corresponding to each of the k candidate connection solutions. In the technical solution provided by the embodiment of the present disclosure, on one hand, the k candidate connection solutions are automatically generated according to the preset connection solution, and the target connection solution is selected therefrom, thereby improving the string connection efficiency of the photovoltaic modules. On the other hand, the photovoltaic modules are partitioned, and the target connection solution corresponding to each partition is determined. Compared with manual string connection where the problem of missing photovoltaic modules is likely to occur, the present disclosure can avoid the condition of missing the connection of the photovoltaic modules and ensure integrity.

Figure 7:
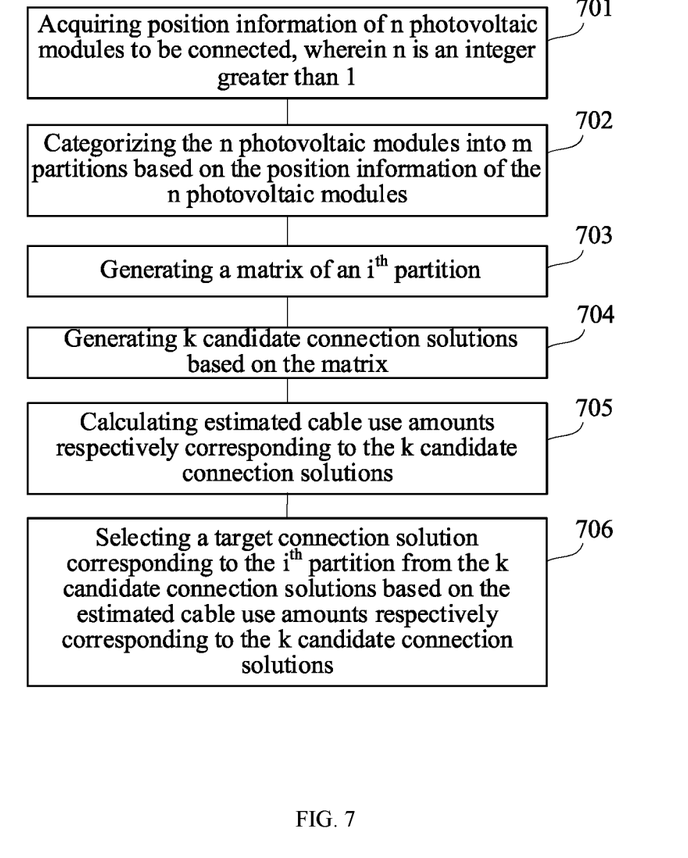
FIG. 7 shows a flowchart of another method for string connecting photovoltaic modules according to an embodiment of the present disclosure.

Referring to FIG. 7, FIG. 7 shows a flowchart of a method for string connecting photovoltaic modules according to another embodiment of the present disclosure. In the present embodiment, the method is mainly applied to the computer device introduced above for illustration. The method may include the following steps:

In step 701, position information of n photovoltaic modules to be connected is obtained, wherein n is an integer greater than 1.

The details of this step are the same as or similar to those of step 601 in the embodiment of FIG. 6, which are not repeated herein.

In step 702, the n photovoltaic modules are categorized into m partitions based on the position information of the n photovoltaic modules.

The details of this step are the same as or similar to those of step 602 in the embodiment of FIG. 6, which are not repeated herein.

In step 703, a matrix of the $i^{th}$ partition is generated.

The matrix is configured to characterize the position distribution of the $n_i$ photovoltaic modules in the $i^{th}$ partition.

When the photovoltaic modules in the $i^{th}$ partition are deployed in rows and columns, the matrix may be a two-bit matrix. Elements in the matrix are located at the intersection points of the rows and columns of the matrix, and the element in the matrix indicate whether there is a photovoltaic module at the corresponding position of the intersection point in the partition.

Exemplarily, if there is a photovoltaic module at the corresponding position of the intersection point in the partition, the element at the intersection point may be represented as 1. Otherwise, if there is no photovoltaic module at the corresponding position of the intersection point in the partition, the element at the intersection point may be expressed as 0. Therefore, the matrix includes $n_i$ 1 elements.

In step 704, k candidate connection solutions are generated based on the matrix.

Based on the above matrix, $n_i$ 1 elements in the matrix may be connected according to a preset connection solution, thereby obtaining k candidate connection solutions.

In some optional embodiments, one photovoltaic module may be selected from the $n_i$ photovoltaic modules as a starting point at first, and a candidate connection solution is obtained by connecting the $n_i$ photovoltaic modules according to a preset module string capacity and a preset module selection priority. Then the starting point is replaced, another candidate connection solution is obtained by connecting the $n_i$ photovoltaic modules by the above step, until the k candidate connection solutions are generated.

Figure 8:
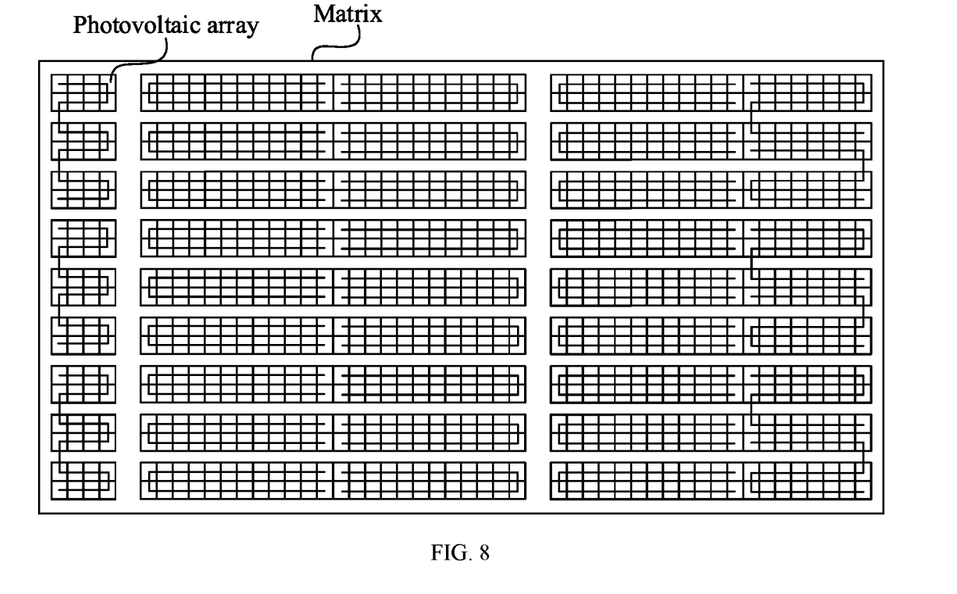
FIG. 8 shows a schematic diagram of a photovoltaic matrix according to an embodiment of the present disclosure.

Referring to FIG. 8, FIG. 8 shows a schematic diagram of a photovoltaic matrix according to an embodiment of the present disclosure. As shown in FIG. 8, the module string capacity is the number of photovoltaic modules contained in the string of photovoltaic modules, the matrix includes at least one photovoltaic array, and the module selection priority in a descending order of priority is: the photovoltaic modules of a first photovoltaic array, the photovoltaic modules of a second photovoltaic array, and the photovoltaic modules of a third photovoltaic array in sequence.

Figure 9:
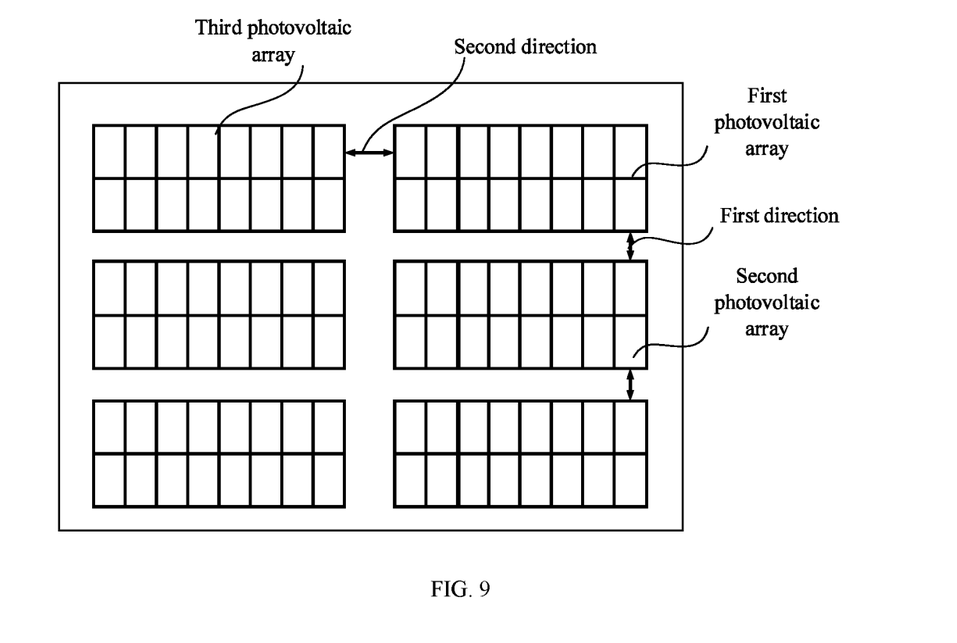
FIG. 9 shows a schematic diagram of another photovoltaic matrix according to an embodiment of the present disclosure.

Referring to FIG. 9, FIG. 9 shows a schematic diagram of another photovoltaic matrix according to an embodiment of the present disclosure. As shown in FIG. 9, the first photovoltaic array is a photovoltaic array where the photovoltaic modules in a currently generated string of photovoltaic modules are located, the second photovoltaic array is an adjacent photovoltaic array of the first photovoltaic array in a first direction, and the third photovoltaic array is an adjacent photovoltaic array of the first photovoltaic array in a second direction; and a distance between the first photovoltaic array and the second photovoltaic array is less than a distance between the first photovoltaic array and the third photovoltaic array.

In some optional embodiments, with part of the $n_i$ photovoltaic modules as the starting points respectively, the $n_i$ photovoltaic modules are connected to generate the candidate connection solutions corresponding to respective starting points; or with each of the $n_i$ photovoltaic modules as the starting point, the $n_i$ photovoltaic modules are connected to generate the candidate connection solutions corresponding to the respective starting points.

In some optional embodiments, part of the $n_i$ photovoltaic modules are photovoltaic modules corresponding to the elements at respective corner points of the matrix.

In some optional embodiments, part of the $n_i$ photovoltaic modules are photovoltaic modules corresponding to the elements at the edges of the matrix.

In some optional embodiments, the method of obtaining a candidate connection solution may include the following steps:
1. One photovoltaic module is selected from the $n_i$ photovoltaic modules as the starting point, and according to the module string capacity, the photovoltaic modules in the same photovoltaic array are preferentially connected into the string of photovoltaic modules.
2. When there is an unconnected photovoltaic module in the photovoltaic array, the photovoltaic module is connected across the photovoltaic array.
3. When the $n_i$ photovoltaic modules are connected, a candidate connection solution is obtained.

In some optional embodiments, the U-shaped connection is preferentially selected to connect the photovoltaic modules into a string, the straight line connection is secondly selected to connect the photovoltaic modules into a string, and then the S-shaped connection is selected to connect the photovoltaic modules into a string.

The unconnected photovoltaic module is preferentially connected into a string with other unconnected photovoltaic modules in the photovoltaic array where such unconnected photovoltaic module is located. When the number of the unconnected photovoltaic modules in the photovoltaic array where such unconnected photovoltaic module is located is less than the module string capacity, the string of photovoltaic modules is connected to the photovoltaic modules in the adjacent photovoltaic array across the photovoltaic array.

In some optional embodiments, the module string capacities of the strings of photovoltaic modules are the same.

Figure 10:
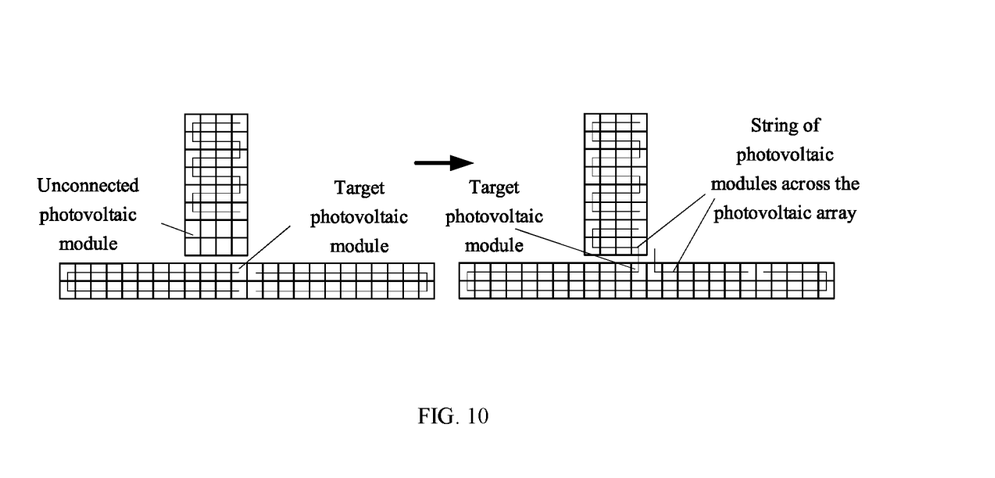
FIG. 10 shows a schematic diagram of a string of photovoltaic modules across a photovoltaic array according to an embodiment of the present disclosure.

Referring to FIG. 10, FIG. 10 shows a schematic diagram of a string of photovoltaic modules across a photovoltaic array according to an embodiment of the present disclosure. As shown in FIG. 10, step 2 may also include the following sub-steps:
(1) A target photovoltaic module that belongs to a different photovoltaic array from the unconnected photovoltaic module and is most proximal to the unconnected photovoltaic module is determined.
(2) The string of photovoltaic modules where the target photovoltaic module is located is disconnected when the target photovoltaic module has been connected to the string.
(3) A string of photovoltaic modules across the photovoltaic array is obtained by connecting the target photovoltaic module to the unconnected photovoltaic module.

In some optional embodiments, the string of photovoltaic modules with the number of photovoltaic modules being less than the module string capacity may be obtained by connecting the unconnected photovoltaic modules in respective photovoltaic arrays into a string.

In some optional embodiments, the string of photovoltaic modules with the number of photovoltaic modules being equal to the module string capacity may be obtained by connecting the unconnected photovoltaic modules to one another, with no need to disconnect the connected string of photovoltaic modules.

In step 705, the estimated cable use amounts respectively corresponding to the k candidate connection solutions are calculated.

The details of this step are the same as or similar to those of step 604 in the embodiment of FIG. 6, which are not repeated herein.

In step 706, the target connection solution corresponding to the $i^{th}$ partition is selected from the k candidate connection solutions based on the estimated cable use amounts respectively corresponding to the k candidate connection solutions.

The details of this step are the same as or similar to those of step 605 in the embodiment of FIG. 6, which are not repeated herein.

In summary, in the embodiment of the present disclosure, the arrangement of the photovoltaic modules is simplified by generating the matrix corresponding to the partition, and the process of determining the target connection solution is simplified.

In the embodiment of the present disclosure, when the photovoltaic modules are connected, the photovoltaic modules in the same photovoltaic array are connected preferentially. When the photovoltaic modules are connected across the photovoltaic array, the photovoltaic modules in the second photovoltaic array with a closer distance are connected preferentially, and the total connection distance is reduced as far as possible, thereby reducing the use amount of the cables.

In an exemplary embodiment, before step 704, the following sub-steps may be further included:

1. Parameters and history environmental information of the $n_i$ photovoltaic modules are obtained.
2. A maximum value and a minimum value of the numbers of photovoltaic modules contained in the strings of photovoltaic modules are determined based on the parameters and the history environmental information of the $n_i$ photovoltaic modules.
3. The module string capacity is set based on the maximum value and the minimum value, wherein the module string capacity is the number of photovoltaic modules contained in the string of photovoltaic modules, and the module string capacity is between the maximum value and the minimum value.

The parameters of the photovoltaic modules include an open circuit voltage, a working voltage, a rated power, an open circuit voltage temperature coefficient, a working voltage temperature coefficient, an extreme high temperature and an extreme low temperature under working conditions, etc., of the photovoltaic modules. The history environmental information includes a history highest temperature, a history lowest temperature, etc., of the $i^{th}$ partition.

In some optional embodiments, determining the maximum value and the minimum value may refer to the following formula 1 and formula 2 respectively:

$$N_{min} = \text{roundup}\left(\max\left(\frac{V_{mpptmini}}{V_{pm} \times [1 + (t' - 25) \times K'_v]}, \frac{r_{min} \times P_{inv}}{M_{in} \times P_{mod}}\right)\right) \text{ Formula 1}$$

$$N_{max} = \text{rounddown}\left(\min\left(\frac{V_{dcmax}}{V_{oc} \times [1 + (t - 25) \times K_v]}, \frac{r_{max} \times P_{inv}}{M_{in} \times P_{mod}}\right)\right) \text{ Formula 2}$$

$N_{min}$ represents a smallest integer value of the module string capacity; $N_{max}$ represents a largest integer value of the module string capacity; $K_v$ represents the open circuit voltage temperature coefficient of the photovoltaic module, and the unit is %/° C.; $K_v'$ represents the open circuit voltage temperature coefficient of the photovoltaic module, and the unit is %/° C.; t represents the extreme low temperature under working conditions of the photovoltaic module, and the unit is ° C.; t' represents the extreme high temperature under the working conditions of the photovoltaic module, and the unit is ° C.; $V_{dcmax}$ represents a maximum direct current input voltage allowed by the inverter, and the unit is V (volts); $V_{mpptmin}$ represents a minimum voltage value of a maximum power point tracking (MPPT) solar controller of the inverter, and the unit is V; $V_{oc}$ represents the open circuit voltage of the photovoltaic module, and the unit is V; $V_{pm}$ represents the working voltage of the photovoltaic module, and the unit is V; $r_{min}$ represents the minimum value of an over-match ratio; $r_{max}$ represents the maximum value of the over-match ratio; $P_{inv}$ represents the rated power of the inverter, and the unit is W (watts); $P_{mod}$ represents the rated power of the photovoltaic module and the unit is W; and $M_{in}$ represents the number of inputs of the inverter.

In the above embodiments, the maximum value and the minimum value of the module string capacity are calculated by the formulas, and a reasonable module string capacity can be selected between the maximum value and the minimum value. On one hand, the power generation efficiency of the photovoltaic system will not be too low due to the excessive low module string capacity, thereby improving the power generation efficiency of the photovoltaic system as much as possible. On the other hand, the photovoltaic modules or the inverter will not be burnt out due to the excessively high module string capacity, thereby prolonging the service life of the photovoltaic modules and the inverter.

The following describes the apparatus embodiment of the present disclosure, which can be configured to implement the method embodiment of the present disclosure. For the details not disclosed in the apparatus embodiment of the present disclosure, reference may be made to the method embodiment of the present disclosure.

Figure 11:
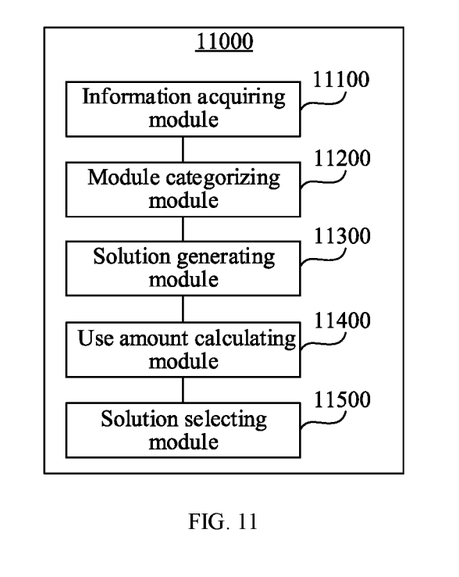
FIG. 11 shows a block diagram of an apparatus for string connecting photovoltaic modules according to an embodiment of the present disclosure.

Referring to FIG. 11, FIG. 11 shows a block diagram of an apparatus for string connecting photovoltaic modules according to an embodiment of the present disclosure. In combination with FIG. 11, the apparatus 11000 has the function of realizing the above method example, and the function may be realized by hardware, or by executing corresponding software through the hardware. The apparatus 11000 may be a computer device, or may be set in the computer device. As shown in FIG. 11, the apparatus 11000 may include an information acquiring module 11100, a module categorizing module 11200, a solution generating module 11300, a use amount calculating module 11400, and a solution selecting module 11500.

The information obtaining module 11100 is configured to acquire position information of n photovoltaic modules to be connected, wherein n is an integer greater than 1.

The module categorizing module 11200 is configured to categorize the n photovoltaic modules into m partitions based on the position information of the n photovoltaic modules, wherein each of the partitions includes a plurality of photovoltaic modules, and m is an integer greater than 1 and less than n.

The solution generating module 11300 is configured to generate k candidate connection solutions of the $i^{th}$ partition in the m partitions, wherein the $i^{th}$ partition includes $n_i$ photovoltaic modules, and each of the k candidate connection solutions uses one of the $n_i$ photovoltaic modules as a starting point, and obtains at least one string of photovoltaic modules by simulating connection of the $n_i$ photovoltaic modules according to a preset connection solution, i is a positive integer less than or equal to m, $n_i$ is an integer greater than 1 and less than n, and k is an integer greater than 1.

The use amount calculating module 11400 is configured to calculate estimated cable use amounts respectively corresponding to the k candidate connection solutions.

The solution selecting module 11500 is configured to select a target connection solution corresponding to the $i^{th}$ partition from the k candidate connection solutions based on the estimated cable use amounts respectively corresponding to the k candidate connection solutions.

In summary, in the embodiment of the present disclosure, by obtaining the position information of the photovoltaic modules, the photovoltaic modules are partitioned. In each partition, with different photovoltaic modules as the starting point, according to the preset connection solution, k candidate connection solutions are generated, and then the target connection solution is selected based on the estimated cable use amount corresponding to each of the k candidate connection solutions. In the technical solution provided by the embodiment of the present disclosure, the k candidate connection solutions are automatically generated according to the preset connection solution, and the target connection solution is selected therefrom, thereby improving the string connection efficiency of the photovoltaic modules. Furthermore, the photovoltaic modules are partitioned, and the target connection solution corresponding to each partition is determined. Compared with manual string connection where the problem of missing photovoltaic modules is likely to occur, the present disclosure can avoid the condition of missing the connection of the photovoltaic modules and ensure integrity.

Figure 12:
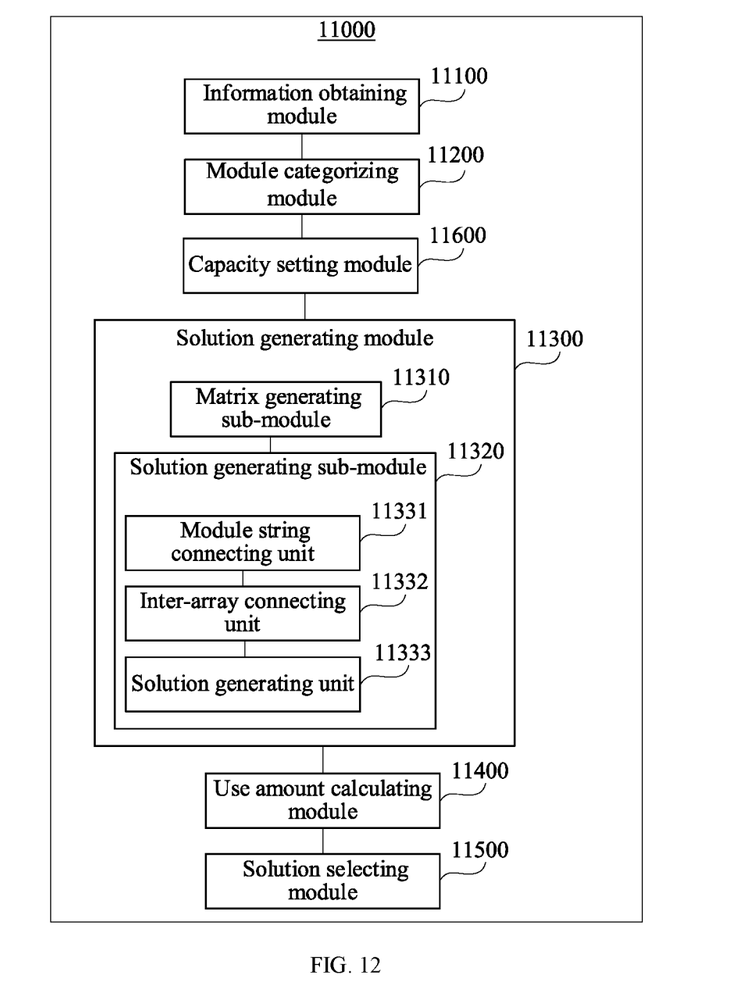
FIG. 12 shows a block diagram of an apparatus for string connecting photovoltaic modules according to another embodiment of the present disclosure.

In an exemplary embodiment, as shown in FIG. 12, the solution generating module 11300 includes: a matrix generating sub-module 11310 and a solution generating sub-module 11320.

The matrix generating sub-module 11300 is configured to generate a matrix of the $i^{th}$ partition, wherein the matrix is configured to characterize a position distribution of the $n_i$ photovoltaic modules in the $i^{th}$ partition.

The solution generating sub-module 11320 is configured to generate the k candidate connection solutions based on the matrix.

In an exemplary embodiment, as shown in FIG. 12, the solution generating sub-module 11320 is configured to select one photovoltaic module from the $n_i$ photovoltaic modules as the starting point, and obtain one candidate connection solution by connecting the $n_i$ photovoltaic modules according to a preset module string capacity and a preset module selection priority.

The solution generating sub-module 11320 is further configured to replace the starting point, and obtain another candidate connection solution by connecting the $n_i$ photovoltaic modules by the above step, until the k candidate connection solutions are generated.

The module string capacity is the number of photovoltaic modules contained in the string of photovoltaic modules, the matrix includes at least one photovoltaic array, and the module selection priority is in a descending order of: the photovoltaic modules of a first photovoltaic array, the photovoltaic modules of a second photovoltaic array, and the photovoltaic modules of a third photovoltaic array in sequence.

The first photovoltaic array is a photovoltaic array where the photovoltaic modules in a currently generated string of photovoltaic modules are located, the second photovoltaic array is an adjacent photovoltaic array of the first photovoltaic array in a first direction, and the third photovoltaic array is an adjacent photovoltaic array of the first photovoltaic array in a second direction; and a distance between the first photovoltaic array and the second photovoltaic array is less than a distance between the first photovoltaic array and the third photovoltaic array.

In an exemplary embodiment, as shown in FIG. 12, the solution generating sub-module 11320 includes: a module string connecting unit 11331, an inter-array connecting unit 11332 and a solution generating unit 11333.

The module string connecting unit 11331 is configured to select one photovoltaic module from the $n_i$ photovoltaic modules as the starting point, and preferentially connect the photovoltaic modules in the same photovoltaic array into the string of photovoltaic modules according to the module string capacity.

The inter-array connecting unit 11332 is configured to connect the photovoltaic module across the photovoltaic array when an unconnected photovoltaic module is present in the photovoltaic array.

The solution generating unit 11333 is configured to obtain one candidate connection solution after the $n_i$ photovoltaic modules are connected.

In an exemplary embodiment, as shown in FIG. 12, the inter-array connecting unit 11332 is configured to determine a target photovoltaic module that belongs to a different photovoltaic array from the unconnected photovoltaic module and is most proximal to the unconnected photovoltaic module; disconnect the string of photovoltaic modules where the target photovoltaic module is located when the target photovoltaic module has been connected to the string; and obtain a string of photovoltaic modules across the photovoltaic array by connecting the target photovoltaic module to the unconnected photovoltaic module.

In an exemplary embodiment, as shown in FIG. 12, the apparatus 11000 further includes a capacity setting module 11600, configured to acquire parameters and history environmental information of the $n_i$ photovoltaic modules; determine a maximum value and a minimum value of the numbers of photovoltaic modules contained in the strings of photovoltaic modules based on the parameters and the history environmental information of the $n_i$ photovoltaic modules; and set the module string capacity based on the maximum value and the minimum value, wherein the module string capacity is the number of photovoltaic modules contained in the string of photovoltaic modules, and the module string capacity is between the maximum value and the minimum value.

In an exemplary embodiment, the solution selecting module 11500 is configured to determine a minimum value of the estimated cable use amounts respectively corresponding to the k candidate connection solutions; and determine the candidate connection solution corresponding to the minimum value of the estimated cable use amounts as the target connection solution.

Figure 13:
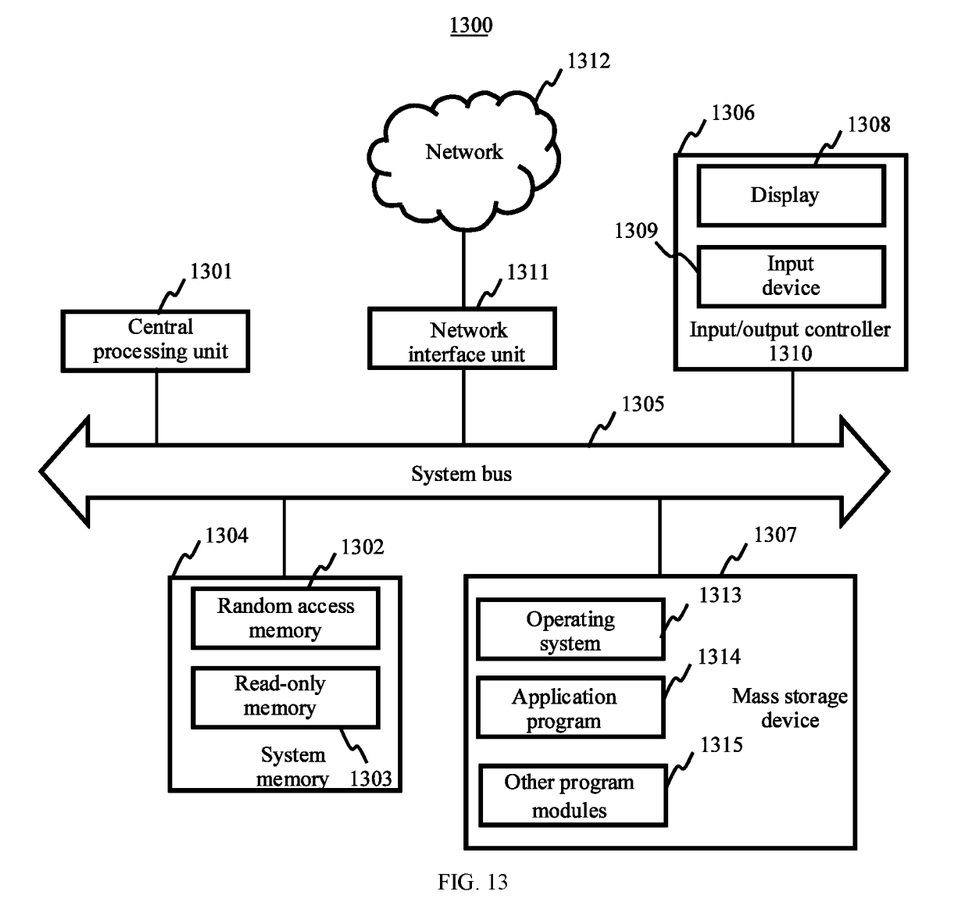
FIG. 13 shows a structural block diagram of a computer device according to an embodiment of the present disclosure.

FIG. 13 shows a structural block diagram of a computer device according to an embodiment of the present disclosure. The computer device is configured to implement the method for string connecting photovoltaic modules according to the above embodiment. With reference to FIG. 13, specifically:

The computer device 1300 includes a central processing unit (CPU) 1301, a system memory 1304 including a random access memory (RAM) 1302 and a read-only memory (ROM) 1303, and a system bus 1305 connected to the system memory 1304 and the central processing unit 1301. The computer device 1300 also includes a basic input/output (I/O) system 1306 that helps information transmission among various devices in the computer, and a mass storage device 1307 for storing an operating system 1313, an application program 1314, and other program modules 1312.

The basic input/output system 1306 includes a display 1308 for displaying information and an input device 1309, such as a mouse and a keyboard, for the user to input information. The display 1308 and the input device 1309 are both connected to the central processing unit 1301 through an input and output controller 1310 connected to the system bus 1305. The basic input/output system 1306 may also include the input and output controller 1310 for receiving and processing the inputs from a plurality of other devices such as the keyboard, the mouse, or an electronic stylus. Similarly, the input and output controller 1310 also provides the output to a display screen, a printer, or other types of output devices.

The mass storage device 1307 is connected to the central processing unit 1301 through a mass storage controller (not shown) connected to the system bus 1305. The mass storage device 1307 and computer-readable mediums associated therewith provide nonvolatile storage for the computer device 1300. That is, the mass storage device 1307 may include a computer-readable medium (not shown) such as a hard disk or a compact disc read-only memory (CD-ROM) drive.

Without loss of generality, the computer-readable mediums may include computer storage mediums and communication mediums. The computer storage mediums include volatile and nonvolatile, removable and non-removable mediums implemented in any method or technology for storing the information such as computer-readable instructions, data structures, program modules or other data. The computer storage mediums include the RAM, the ROM, an erasable programmable read-only memory (EPROM), an electrically erasable programmable read-only memory (EEPROM), a flash memory or other solid-state storage technologies, the CD-ROM, a digital video disc (DVD) or other optical storages, a tape cartridge, a magnetic tape, a disk storage or other magnetic storage devices. Those skilled in the art know that the computer storage mediums are not limited to the foregoing. The above system memory 1304 and mass storage device 1307 may be collectively referred to as a memory.

According to various embodiments of the present disclosure, the computer device 1300 may also be connected to a remote computer on the network by the network such as the Internet for operation. That is, the computer device 1300 may be connected to the network 1312 by a network interface unit 1311 connected on the system bus 1305, or in other words, may also be connected to other types of networks or remote computer systems (not shown) by the network interface unit 1311.

In an exemplary embodiment, a computer-readable storage medium is also provided, and a computer program is stored in the storage medium. When the computer program is executed by a processor, the above method for string connecting photovoltaic modules is implemented.

In an exemplary embodiment, a computer program product is also provided. When being executed by the processor, the computer program product is configured to implement the above method for string connecting photovoltaic modules.

It should be understood that the numbers of the steps described herein only exemplarily show a feasible order of execution of the steps. In some other embodiments, the above steps may also be executed out of the order of numbers, for example, two steps with different numbers are executed at the same time, or the two steps with different numbers are executed in the order reverse to the drawing, which is not limited in the embodiment of the present disclosure.

Described above are merely exemplary embodiments of the present disclosure, which are not intended to limit the present disclosure. Any modifications, equivalent replacements and improvements made within the spirits and principles of the present disclosure shall all fall in the protection scope of the present disclosure.

What is claimed is:

1. A method for connecting photovoltaic modules in series to define a string of photovoltaic modules, applicable to a computer device, wherein each of the photovoltaic modules is a basic power generation unit of a photovoltaic system, the method comprising:

acquiring position information of n photovoltaic modules to be connected, wherein n is an integer greater than 3 and the n photovoltaic modules are already deployed;

categorizing the n photovoltaic modules into m partitions based on the position information of the n photovoltaic modules, wherein each of the partitions comprises a plurality of photovoltaic modules, and m is an integer greater than 1 and less than n;

generating k candidate connection solutions of an $i^{th}$ partition in the m partitions, wherein the $i^{th}$ partition comprises $n_i$ photovoltaic modules, and each of the k candidate connection solutions uses a different one of the $n_i$ photovoltaic modules as a starting point, and obtains at least two strings of photovoltaic modules by simulating connection of the $n_i$ photovoltaic modules according to a preset connection solution, i is a positive integer less than or equal to m, $n_i$ is an integer greater than 1 and less than n, and k is an integer greater than 1;

calculating estimated cable use amounts respectively corresponding to the k candidate connection solutions; and selecting a target connection solution corresponding to the $i^{th}$ partition from the k candidate connection solutions based on the estimated cable use amounts respectively corresponding to the k candidate connection solutions.

2. The method according to claim 1, wherein generating the k candidate connection solutions of the $i^{th}$ partition in the m partitions comprises:

generating a matrix of the $i^{th}$ partition, wherein the matrix is configured to characterize a position distribution of the $n_i$ photovoltaic modules in the $i^{th}$ partition; and generating the k candidate connection solutions based on the matrix.

3. The method according to claim 2, wherein generating the k candidate connection solutions based on the matrix comprises:

selecting one photovoltaic module from the $n_i$ photovoltaic modules as the starting point, and obtaining one candidate connection solution by connecting the $n_i$ photovoltaic modules according to a preset module string capacity and a preset module selection priority; and replacing the starting point, and obtaining another candidate connection solution by connecting the $n_i$ photovoltaic modules according to the preset module string capacity and the preset module selection priority, until the k candidate connection solutions are generated;

wherein the module string capacity is a number of photovoltaic modules contained in each of the at least two strings of photovoltaic modules, the matrix comprises a first photovoltaic array, a second photovoltaic array and a third photovoltaic array, each of which includes a plurality of the photovoltaic modules and is spaced apart from the other two photovoltaic arrays, and the module selection priority is in a descending order of: the photovoltaic modules of the first photovoltaic array, the photovoltaic modules of the second photovoltaic array, and the photovoltaic modules of the third photovoltaic array in sequence;

wherein the first photovoltaic array is a photovoltaic array where the photovoltaic modules in a currently generated string of photovoltaic modules are located, the second photovoltaic array is an adjacent photovoltaic array of the first photovoltaic array in a first direction, and the third photovoltaic array is an adjacent photovoltaic array of the first photovoltaic array in a second direction; and a distance between the first photovoltaic array and the second photovoltaic array is less than a distance between the first photovoltaic array and the third photovoltaic array.

4. The method according to claim 3, wherein selecting one photovoltaic module from the $n_i$ photovoltaic modules as the starting point, and obtaining one candidate connection solution by connecting the $n_i$ photovoltaic modules according to the preset module string capacity and the preset module selection priority comprise:

selecting one photovoltaic module from the $n_i$ photovoltaic modules as the starting point, selecting one photovoltaic module from the $n_i$ photovoltaic modules as the starting point, and obtaining one of the at least two strings of photovoltaic modules by preferentially connecting the photovoltaic modules in the first photovoltaic array in series according to the module string capacity;

when an unconnected photovoltaic module is present in the first photovoltaic array, connecting the unconnected photovoltaic module across the first photovoltaic array; and obtaining one candidate connection solution after the $n_i$ photovoltaic modules are connected.

5. The method according to claim 4, wherein connecting the unconnected photovoltaic module across the first photovoltaic array comprises:

determining a target photovoltaic module that belongs to a different photovoltaic array from the first photovoltaic array and is most proximal to the unconnected photovoltaic module;

disconnecting the string of photovoltaic modules where the target photovoltaic module is located when the target photovoltaic module has been connected to the string; and obtaining a string of photovoltaic modules across the first photovoltaic array by connecting the target photovoltaic module to the unconnected photovoltaic module.

6. The method according to claim 1, wherein prior to generating the k candidate connection solutions of the $i^{th}$ partition in the m partitions, the method further comprises:

acquiring parameters and history environmental information of the $n_i$ photovoltaic modules that are deployed;

determining a maximum value and a minimum value of numbers of photovoltaic modules contained in the strings of photovoltaic modules based on the parameters and the history environmental information of the $n_i$ photovoltaic modules; and setting a module string capacity of the $i^{th}$ partition based on the maximum value and the minimum value, wherein the module string capacity is the number of photovoltaic modules contained in the string of photovoltaic modules, and the module string capacity is between the maximum value and the minimum value.

7. The method according to claim 1, wherein selecting the target connection solution corresponding to the $i^{th}$ partition from the k candidate connection solutions based on the estimated cable use amounts respectively corresponding to the k candidate connection solutions comprises:

determining a minimum value of the estimated cable use amounts respectively corresponding to the k candidate connection solutions; and determining the candidate connection solution corresponding to the minimum value of the estimated cable use amounts as the target connection solution corresponding to the $i^{th}$ partition.

8. An apparatus for connecting photovoltaic modules in series to define a sting of photovoltaic modules, wherein each of the photovoltaic modules is a basic power generation unit of a photovoltaic system, comprising:

an information acquiring module, configured to acquire position information of n photovoltaic modules to be connected, wherein n is an integer greater than 3 and the n photovoltaic modules are already deployed;

a module categorizing module, configured to categorize the n photovoltaic modules into m partitions based on the position information of the n photovoltaic modules, wherein each of the partitions comprises a plurality of photovoltaic modules, and m is an integer greater than 1 and less than n;

a solution generating module, configured to generate k candidate connection solutions of an $i^{th}$ partition in the m partitions, wherein the $i^{th}$ partition comprises $n_i$ photovoltaic modules, and each of the k candidate connection solutions uses a different one of the $n_i$ photovoltaic modules as a starting point, and obtains at least two strings of photovoltaic modules by simulating connection of the $n_i$ photovoltaic modules according to a preset connection solution, i is a positive integer less than or equal to m, $n_i$ is an integer greater than 1 and less than n, and k is an integer greater than 1;

a use amount calculating module, configured to calculate estimated cable use amounts respectively corresponding to the k candidate connection solutions; and a solution selecting module, configured to select a target connection solution corresponding to the $i^{th}$ partition from the k candidate connection solutions based on the estimated cable use amounts respectively corresponding to the k candidate connection solutions.

9. A computer device, comprising a processor and a memory storing a computer program therein, wherein the computer program, when loaded and run by the processor, causes the processor to perform the method for string connecting photovoltaic modules as defined in claim 1.

10. A non-transitory computer-readable storage medium storing a computer program therein, wherein the computer program, when loaded and run by the processor, causes the processor to perform the method for string connecting photovoltaic modules as defined in claim 1.

* * * * *